United States Patent
Krack et al.

(10) Patent No.: US 9,560,208 B2
(45) Date of Patent: Jan. 31, 2017

(54) SYSTEM AND METHOD FOR PROVIDING INTELLIGENT AND AUTOMATIC MUTE NOTIFICATION

(71) Applicant: Avaya Inc., Basking Ridge, NJ (US)

(72) Inventors: Michael Krack, St. Pete Beach, FL (US); Jai Pugalia, San Jose, CA (US); Doug Zumbiel, Aptos, CA (US); Wayne Wong, Milpitas, CA (US); Jeffrey Wong, San Jose, CA (US)

(73) Assignee: Avaya Inc., Basking Ridge, NJ (US)

( * ) Notice: Subject to any disclaimer, the term of this patent is extended or adjusted under 35 U.S.C. 154(b) by 87 days.

(21) Appl. No.: 14/149,028

(22) Filed: Jan. 7, 2014

(65) Prior Publication Data

US 2015/0195411 A1    Jul. 9, 2015

(51) Int. Cl.
 *H04M 3/42* (2006.01)
 *H04M 3/56* (2006.01)
 *H04M 3/428* (2006.01)

(52) U.S. Cl.
 CPC ........... *H04M 3/569* (2013.01); *H04M 3/4285* (2013.01); *H04M 2203/2027* (2013.01)

(58) Field of Classification Search
 CPC ............... H04M 3/569; H04M 3/4285; H04M 2203/2027; H04M 3/566; H04M 3/568
 USPC ... 379/202.01–206.01, 207.02, 421; 455/416
 See application file for complete search history.

(56) References Cited

U.S. PATENT DOCUMENTS

| | | | |
|---|---|---|---|
| 8,019,078 B2 | 9/2011 | Chavez et al. | |
| 8,064,595 B2 | 11/2011 | Brown et al. | |
| 8,311,196 B2 | 11/2012 | Hanson et al. | |
| 8,451,996 B2 | 5/2013 | Hanson et al. | |
| 8,467,524 B1 * | 6/2013 | Lee et al. | 379/421 |
| 8,494,153 B2 | 7/2013 | Brown et al. | |
| 2003/0185371 A1 | 10/2003 | Dobler | |
| 2006/0280295 A1 * | 12/2006 | Runcie | 379/88.26 |
| 2007/0037536 A1 * | 2/2007 | Battaglini et al. | 455/212 |
| 2009/0022305 A1 * | 1/2009 | Chavez et al. | 379/388.03 |
| 2010/0067680 A1 | 3/2010 | Hanson et al. | |
| 2010/0260332 A1 * | 10/2010 | Brown | H04M 9/08 379/421 |
| 2013/0051543 A1 * | 2/2013 | McDysan et al. | 379/202.01 |

* cited by examiner

*Primary Examiner* — Harry S Hong
(74) *Attorney, Agent, or Firm* — Sheridan Ross P.C.

(57) ABSTRACT

A communication device is described along with various methods and systems for controlling the same. Methods are provided that monitor audio from a local and remote audio stream when determining whether to provide a mute notification on a muted call. In general, when a mute function of a communication device is active and a user attempts to speak, the system can analyze the user's local audio stream and the call's remote audio stream to determine whether characteristics exist to provide a mute notification to the user. The system provides mechanisms for controlling false positive determinations of speaking through mute by utilizing a combination of recorded characteristics and initiated timers that can be adjusted based on determinations made.

20 Claims, 4 Drawing Sheets

SYSTEM AND METHOD FOR PROVIDING INTELLIGENT AND AUTOMATIC MUTE NOTIFICATION

FIELD OF THE DISCLOSURE

The present disclosure is generally directed toward communications and more specifically toward multi-party communications.

BACKGROUND

When making calls between entities, a user may find it convenient, or even necessary, to mute the microphone of the user's communication device. In other words, a user may initiate a mute function associated with a communication device to prevent the microphone conveying sound to one or more other users participating in the call. Among other things, muting the microphone can provide a user with a certain level of privacy by preventing one or more other users from hearing what the user is doing or saying while the mute function is active. Some of the benefits associated with muting the communication device may include the ability for a user to hold a private conversation, cough, sneeze, perform other tasks, use another communication device, type on a keyboard, prevent distraction in a noisy environment, and the like.

Although it is common practice to mute a telephone while on a call, it is even more common when a user is on a conference call. It is a frequent occurrence, however, that one or more of the users participating in a conference call may forget to deactivate, or unmute, the mute function of their device. In this instance, a user may begin to speak to other conference participants without realizing that the mute function is still active, and as a result, the user cannot be heard by the other participants. Complicating the issue, the user may not be aware that the mute is still active until no other participant in the call acknowledges or responds to their dialogue. As can be appreciated, this scenario does not result in a desirable user experience. Not only is it frustrating for a user to speak and later realize that nothing spoken was heard, but it can also be embarrassing for the user and others in the call. Moreover, any delay caused between what the user thought was heard during an active mute and what the user must repeat when the mute is deactivated wastes the time of the teleconference participants and can disrupt the flow of a discussion.

Some have attempted to solve the problem of notifying users that a mute function has been engaged by providing an alert to a user. The alert may be provided in the form of a periodic tone, or "beep," that is output to the speaker of a user's telephone device. In some cases, the alert may be provided in the form of a flashing light, or text, to try and alert a user when the mute function of a telephone device is activated. In any event, it is expected that a user should hear, or see, the alert and respond by deactivating the mute function before attempting to participate in a conversation.

Unfortunately, these alerts do not adequately solve the problem associated with mute notification in communications across a network. For example, the periodic tone can be distracting to a user and may even mask the call content with each tone output. In other words, as the periodic tone is output to the user's device, any coincident audio output by the one or more other participants in the call may be cutoff, misunderstood, or result in unintelligible sounds. Furthermore, if the periodic tone is output to sound at longer intervals, a user may speak during the tone intervals only to realize later (e.g., at a subsequent tone output) that the mute function was active. The flashing light, or text, alert may be distracting in some implementations and unnoticeable in other implementations. For example, a bright light, or one having a quick illumination pulse, may be found annoying by a user. In contrast, if the light alert is dim, or displays at long intervals, the alert may go unnoticed. Furthermore, flashing lights suffer from context in their application. For instance, without knowing that the flashing light indicates that mute function of the device is active a user may associate the flashing light with some other meaning (e.g., a call is on hold, incoming call on another line, a message has been left on the device, etc.).

SUMMARY

It is with respect to the above issues and other problems that the embodiments presented herein were contemplated. In general, embodiments of the present disclosure provide methods, devices, and systems that allow a user of a communication device to be notified when a mute function of the communication device is activated. More specifically, when a mute function of a communication device is active and a user attempts to speak, embodiments of the present disclosure can analyze the user's local audio stream and the call's, or remote, audio stream to determine whether certain characteristics exist to provide a mute notification to the user. Additionally or alternatively, the activation of a mute function may be accompanied by the initiation of a timer. The timer may be used to determine mute and/or privacy characteristics. These characteristics may be used to make the determination that audio output provided by the user is private and mute notification is not required, and vice versa. Other characteristics, including but not limited to, timer information, speech patterns, speech analytics, intonation, notification information, and the like, may be associated with a call, a user, and/or user device. In some embodiments, the other characteristics may be detected on the local audio stream and/or the remote audio stream. In some cases, when detected (e.g., locally and/or remotely) the other characteristics may be analyzed locally and/or remotely. By way of example, the analysis may be performed by at least one component locally associated with the user's communication device. In another example, the analysis may be performed by at least one component remotely associated with the user's communication device. Continuing this example, the remote analysis may be performed by an audio analysis module that is configured to receive detected audio from the local and/or remote audio stream(s).

In some embodiments of the present disclosure, a system is provided comprising an audio input device (e.g., a microphone, etc.) capable of detecting local audio, a connection to a remote audio stream (e.g., the audio from a multi-party and/or conference call), a notification service that is configured to provide an audio and/or visual notification/reminder to the user, and an analysis module that is configured to monitor at least one of the local and remote audio streams and determine whether to provide a mute notification based on the monitoring. As used herein, the term "local audio" may refer to audio detected at the communication device of a user and the term "remote audio" may refer to audio provided by one or more users in a multi-party call. The term "multi-party" as used herein may refer to communications involving at least two parties. Examples of multi-party calls may include, but are in no way limited to, person-to-person calls, telephone calls, conference calls, communications between multiple participants, and the like. In one example, the remote audio may be the resultant audio provided by a conferencing service and/or one or more conference mixers combining the available audio of all sources in a multi-party call. Additionally or alternatively, the remote audio may include the audio output from a communication device to at least one other communication device in the multi-party call. This audio output may include an audio signal delivered from the communication device to the at least one other communication device or system. The audio signal may comprise audio content ranging from silence to identifiable sounds.

In one embodiment, the audio input device may be configured such that it cannot be muted from detecting certain audio. By way of example, although a microphone of a communication device may be muted such that local user audio is not provided to other parties in a multi-party call, the microphone may be configured to detect audio from the user of the communication device (e.g., to be used in providing notifications as disclosed herein, etc.). This muting functionality may be provided by a communication device detecting local audio for use in the methods and systems provided herein while preventing the audio from reaching other parties/devices in a multi-party call. In another example, a detection microphone that is separate and apart from a communication device's receiver microphone may be used in embodiments of the present disclosure. In this case, the receiver microphone may be muted to prevent user audio from being transmitted to at least one other communication device/party in a multi-party call while the detection microphone may be used to determine whether to provide mute notification to a user. Additionally or alternatively, the detection microphone may be configured such that it cannot convey audio information to another party and/or communication device participating in the multi-party call.

As disclosed herein, the analysis module may be configured to analyze both the local audio and the remote audio in a multi-party call. This analysis may include monitoring streams of audio. For instance, when the analysis module monitors local audio detected by the audio input device of a communication device, the analysis module can compare the monitored local audio with the remote audio of the multi-party call. In the event that the remote audio does not include the local audio, the analysis module can determine that the mute functionality of the communication device is active. In other words, if the local audio is absent from the remote audio of the multi-party call, the user may be speaking while the mute function is active. Additionally or alternatively, if the remote audio is silent for a predetermined period of time, but local audio is detected while the mute function of a communication device is active, the methods herein may provide a mute notification to the communication device to alert the device of the active mute function.

Embodiments of the present disclosure can minimize false mute notifications by analyzing both the local audio stream as well as the remote audio stream(s). In some embodiments, the system may provide a notification to a user that a mute function of the communication device is active when the system detects a predetermined amount of silence on the remote audio stream and the audio input device of the communication device detects local audio. The predetermined amount of silence may be associated with a time (e.g., 1 second, 3 seconds, 5 seconds, etc.), multiples of a time, and/or fractions of a time. In some cases, these times may be user-configurable. Similarly, the system may notify a user if the system detects local audio after a prolonged silence period on a muted line. For example, if the user activates a mute function (e.g., pressing a mute button) and then begins to speak a few seconds later, the system may determine that the user has activated the mute function to hold a private conversation or one that is not meant to be heard by one or more participants of the multi-party call. This conversation may be held with a local participant who may be co-resident in the room. Among other things, the system disclosed herein can monitor silence durations on the local audio stream, the remote audio stream, and/or both the local and the remote audio streams.

Additionally or alternatively, analysis may be applied to the remote audio stream to determine an average duration of silence periods. The average duration of silence periods may be associated with at least one of a call, a user, a communication device, and the like. In some embodiments, the average duration of silence periods may be used in lieu of user-configured or predetermined silence periods. It is anticipated that the user may be able to select whether to use the average duration of silence periods instead of the predetermined or user-configurable silence periods. For example, the user may select from one or more choices associated with the period such as the following non-limiting examples: 1 second, 2 seconds, 3 seconds, 4 seconds, or Automatic (e.g., the average duration of silence).

In some embodiments, the system may utilize speech recognition techniques to determine whether to provide a mute notification. For instance, the system may use word-spotting (e.g., listening for the user's name), intonation (e.g., detecting that a question has been asked), speech analytics, historical information, and the like associated with the remote audio stream and/or the local audio stream to allow the system to produce a notification without solely relying on the silence duration.

Analysis may be applied to the local audio stream to determine whether to provide mute notifications. For instance, the analysis may track the number of times that a user has attempted to speak while the mute function is active. This tracking may be confirmed by verifying that the mute function was deactivated within an amount of time after the mute notification was issued. Additionally or alternatively, the number of "false positives," that is providing a mute notification where the user was not providing audio for the benefit of the participants in the multi-party call, can be reduced by verifying that the mute function was not deactivated within an amount of time after the mute notification was issued. As can be appreciated, the system accuracy can be improved dynamically by utilizing this data to automatically adjust the silence period duration. By way of example, the system may decrease the silence period duration by a small amount after a number of occurrences of confirmed attempts to speak through mute. Additionally or alternatively, the system may increase the silence period duration by a small amount after a number of occurrences of a false positive.

As provided herein, embodiments of the present disclosure may be built into a telephone, communication device, headset, and the like. Additionally or alternatively, the system may be provided in a proxy device, such as a stand-alone unit, Bluetooth® device, or the like. For instance, the proxy device may provide intelligent mute detection between a Bluetooth® communication device and Bluetooth® headset. In the event that a proxy device is used, the communication device of a user may not need to be modified to implement the intelligent mute notification methods as provided herein. In other embodiments, a separate microphone may not be required when the system is built into a communication device, telephone, and/or headset, as the muting action may be configured to disrupt the primary microphone output after it has been delivered to the mute notification system disclosed herein.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine," "calculate," and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
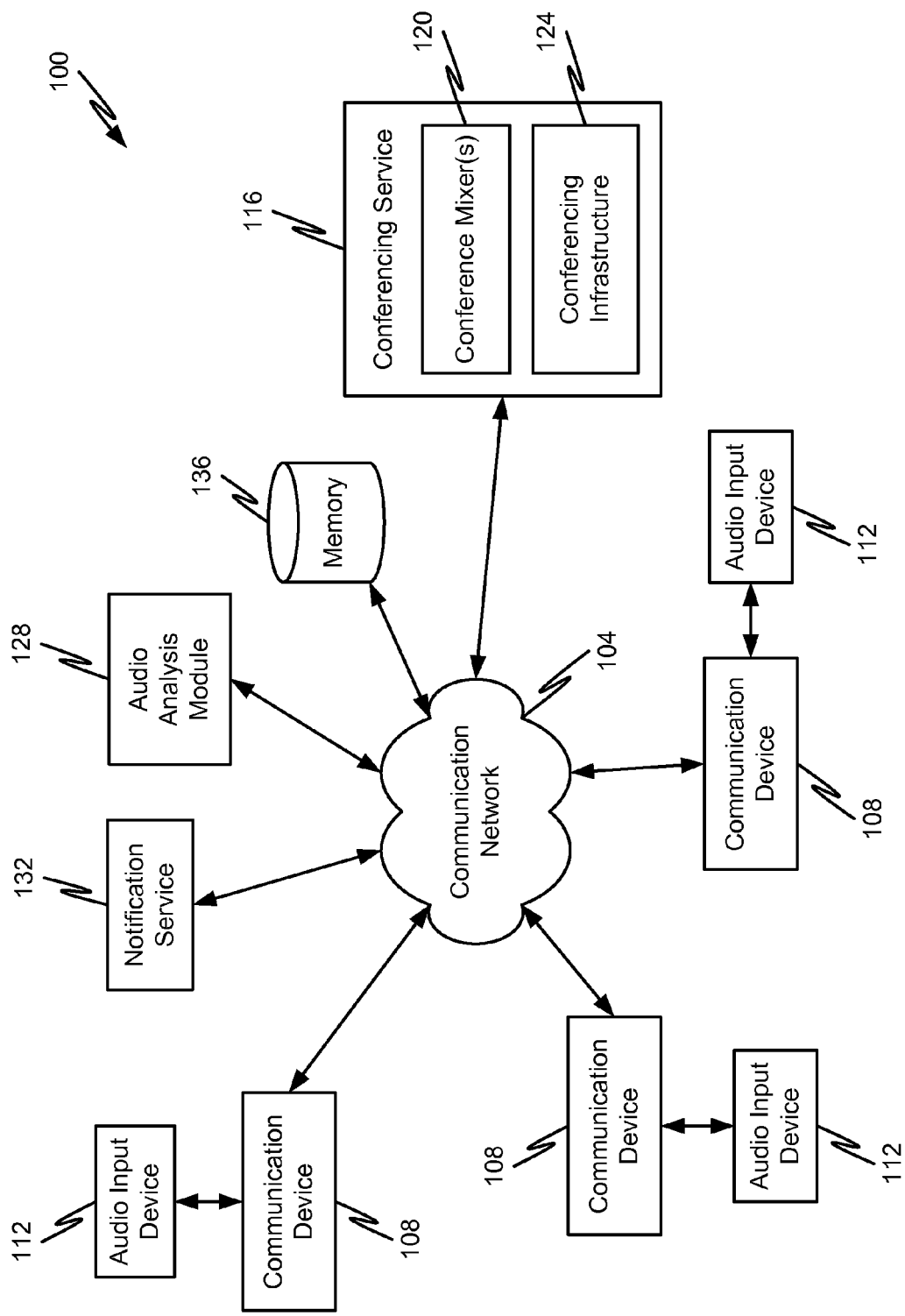
FIG. 1 is a block diagram of a communication system in accordance with embodiments of the present disclosure.

FIG. 1 shows a block diagram of a communication system 100 in accordance with at least some embodiments of the present disclosure. The communication system 100 may be a distributed system and, in some embodiments, comprises a communication network 104 connecting one or more communication devices 108 together. In some embodiments, the one or more communication devices 108 may participate in a multi-party call. For instance, the one or more communication devices 108 may be connected in a multi-party call via a conferencing service 116, a conference bridge, or other similar conferencing system.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over Internet Protocol (VoIP) network, a cellular network, and any other type of packet-switched or circuit-switched network known in the art. In addition, it can be appreciated that the communication network 104 need not be limited to any one network type, and instead may be comprised of a number of different networks and/or network types. Moreover, the communication network 104 may comprise a number of different communication media such as coaxial cable, copper cable/wire, fiber-optic cable, antennas for transmitting/receiving wireless messages, and combinations thereof.

The communication devices 108 may correspond to user communication devices. In accordance with at least some embodiments of the present disclosure, the communication devices 108 may comprise any type of known communication equipment or collection of communication equipment. Examples of a suitable communication device 108 include, but are not limited to, a personal computer, laptop, tablet, Personal Digital Assistant (PDA), cellular phone, smart phone, telephone, or combinations thereof. In general each communication device 108 may be adapted to support video, audio, text, and/or data communications with other communication devices 108 as well as the conferencing service 116. The type of medium used by the communication device 108 to communicate with other communication devices 108 or the conferencing service 116 may depend upon the communication applications available on the communication device 108.

In accordance with at least some embodiments of the present disclosure, a user may utilize their communication device 108 to initiate a call between one or more endpoints. For example, the call may be transmitted as a telephone call, a packet or collection of packets (e.g., IP packets transmitted over an IP network), an email message, an Instant Message, an SMS message, a fax, and combinations thereof. In some embodiments, the communication device 108 may include at least one memory 136. As can be appreciated, the memory 136 may be part of the communication device 108. Additionally or alternatively, the memory 136 may be located across the communication network 104.

The communication device 108 may include one or more audio input devices 112. In some embodiments, the audio input device 112 may be separate from the communication device 108. For example, the audio input device 112 may include, but is not limited to, an audio detection microphone that is separate from a receiver microphone used by the communication device 108 to convey local audio to one or more of other communication devices 108 and a conferencing service 116. In some embodiments, the detection microphone may be configured such that when a mute function is activated for the communication device 108 the mute function does not inhibit the ability of the detection microphone to detect local audio. In some cases, the communication device 108 may include both a detection microphone and another microphone, such as a receiver microphone, as part of the communication device 108 and/or accessory (e.g., headset, etc.).

Additionally or alternatively, the audio input device 112 may be a part of, or built into, the communication device 108. In some embodiments, the audio input device 112 may be the receiver microphone of the communication device 108. Although the receiver microphone may be configured to convey local audio to one or more of other communication devices 108 and a conferencing service 116, it is anticipated that a mute function can be activated that prevents local audio detected at the receiver microphone from being transmitted to the one or more of other communication devices 108 and the conferencing service 116. In this example, the activated mute function may not prevent the receiver microphone from detecting local audio.

In some embodiments, a conferencing service 116 may be included in the communication system 100. The conferencing service 116 provides conferencing resources that can allow two or more communication devices 108 to participate in a multi-party call. One example of a multi-party call includes, but is not limited to, a person-to-person call, a conference call between two or more users/parties, and the like. Although some embodiments of the present disclosure are discussed in connection with multi-party calls, embodiments of the present disclosure are not so limited. Specifically, the embodiments disclosed herein may be applied to one or more of audio, video, multimedia, conference calls, web conferences, and the like.

In some embodiments, the conferencing service 116 can include one or more resources such as conference mixers 120 and other conferencing infrastructure 124. As can be appreciated, the resources of the conferencing service 116 may depend on the type of multi-party call provided by the conferencing service 116. Among other things, the conferencing service 116 may be configured to provide conferencing of at least one media type between any number of participants. The conference mixer 120 may be assigned to a particular multi-party call for a predetermined amount of time. In one embodiment, the conference mixer 120 may be configured to negotiate codecs with each communication device 108 participating in a multi-party call. Additionally or alternatively, the conference mixer 120 may be configured to receive inputs (at least including audio inputs) from each participating communication device 108 and mix the received inputs into a combined signal which can be provided to each communication device 108 in the multi-party call. This combined signal may include the remote audio stream associated with the multi-party call. In some cases, a remote audio stream provided to one or more of the communication devices 108 of a multi-party call may be monitored to determine remote audio content.

The conferencing infrastructure 124 can include hardware and/or software resources of the conferencing service 116 that provide the ability to hold multi-party calls, conference calls, and/or other collaborative communications.

In some embodiments, an analysis module 128 may be used to monitor at least one of the local audio associated with a communication device 108 and the remote audio associated with a multi-party call. As provided herein, the analysis module 128 may detect differences and/or similarities in audio content between streams. For instance, the analysis module 128 may monitor the local audio to detect local audio content and compare the detected local audio content with remote audio content in a remote audio stream. The analysis of these two audio streams can determine whether a mute notification should be issued to a communication device 108 (e.g., when local audio content is absent from the remote audio stream, etc). In one example, a user may be talking while on mute. In this example, the user's speech can be detected by the audio input device 112. Continuing this example, the analysis module 128 may determine that the remote audio stream, in this case the audio output from the communication device 108, does not include the speech detected by the audio input device 112. As such, the communication device 108 may be determined to be on mute.

The notification service 132 may be employed by the analysis module 128 to issue a mute notification to a communication device 108 in the system 100. In some embodiments, the notification may issue as an audible, visual, and/or tactile alert sent to a communication device 108 in response to the analysis module 128 determining that a mute notification should be provided. For example, the notification service 132 may provide an output to the communication device 108 such that a tone is emitted. This tone can remind the user of the communication device 108 that the mute function is activated. The user may then select to deactivate the mute function or allow the mute function to remain activated on the communication device 108. In an optional embodiment, it is anticipated that the mute function may be automatically deactivated upon meeting certain criteria. For instance, historical information associated with use of the mute functionality on a call, patterns of a particular (or even average) user, speech analytics, patterns associated with a communication device 108, and/or the like, may be used to determine when the mute functionality should be deactivated. By way of example, historical information associated with a user who frequently sets the mute function of a communication device 108, then talks while on mute and then subsequently deactivates the mute function, may provide that the mute functionality can be automatically deactivated by the communication device 108 when the user's behavior matches the behavior stored as historical information.

The system 100 may include a memory 136. Among other things, the memory 136 may be used to store instructions, that when executed by a processor of the system 100, perform the methods as provided herein. In some embodiments, one or more of the components (e.g., communication device 108, audio input device 112, conferencing service 116, notification service 132, audio analysis module 128, etc.) of the system 100 may include a memory 136. In one example, each component in the system 100 may have its own memory 136. Continuing this example, the memory 136 may be a part of each component in the system 100. In some embodiments, the memory 136 may be located across a communication network 104 for access by one or more components in the system 100. In any event, the memory 136 may be used in connection with the execution of application programming or instructions by the processor, and for the temporary or long term storage of program instructions and/or data. As examples, the memory 136 may comprise RAM, DRAM, SDRAM, or other solid state memory. Alternatively or in addition, the memory 136 may be used as data storage and can comprise a solid state memory device or devices. Additionally or alternatively, the memory 136 used for data storage may comprise a hard disk drive or other random access memory. In some embodiments, the memory 136 may store information associated with a user, a timer, rules, recorded audio information, notification information, and the like. For instance, the memory 136 may be used to store predetermined speech characteristics, private conversation characteristics, information related to mute activation/deactivation, times associated therewith, combinations thereof, and the like.

Although the analysis module 128, notification service 132, and the memory 136 are depicted as being located separately from the communication device 108, it should be appreciated that one or more of the analysis module 128, the notification service 132, and the memory 136 may be incorporated into one or more communication device 108. Additionally or alternatively, the functionality associated with one or more of the analysis module 128, the notification service 132, and the memory 136 may be executed by another separate server of the communication system 100, the conferencing service 116, a communication device 108, other device, or processor. One example of another device configured to execute the methods provided herein may include a proxy device. In this example, the proxy device may be associated with the communication device 108. Such an association may include one or more of an electrical connection, a wireless connection, communications exchange, combinations thereof, etc.

Figure 2:
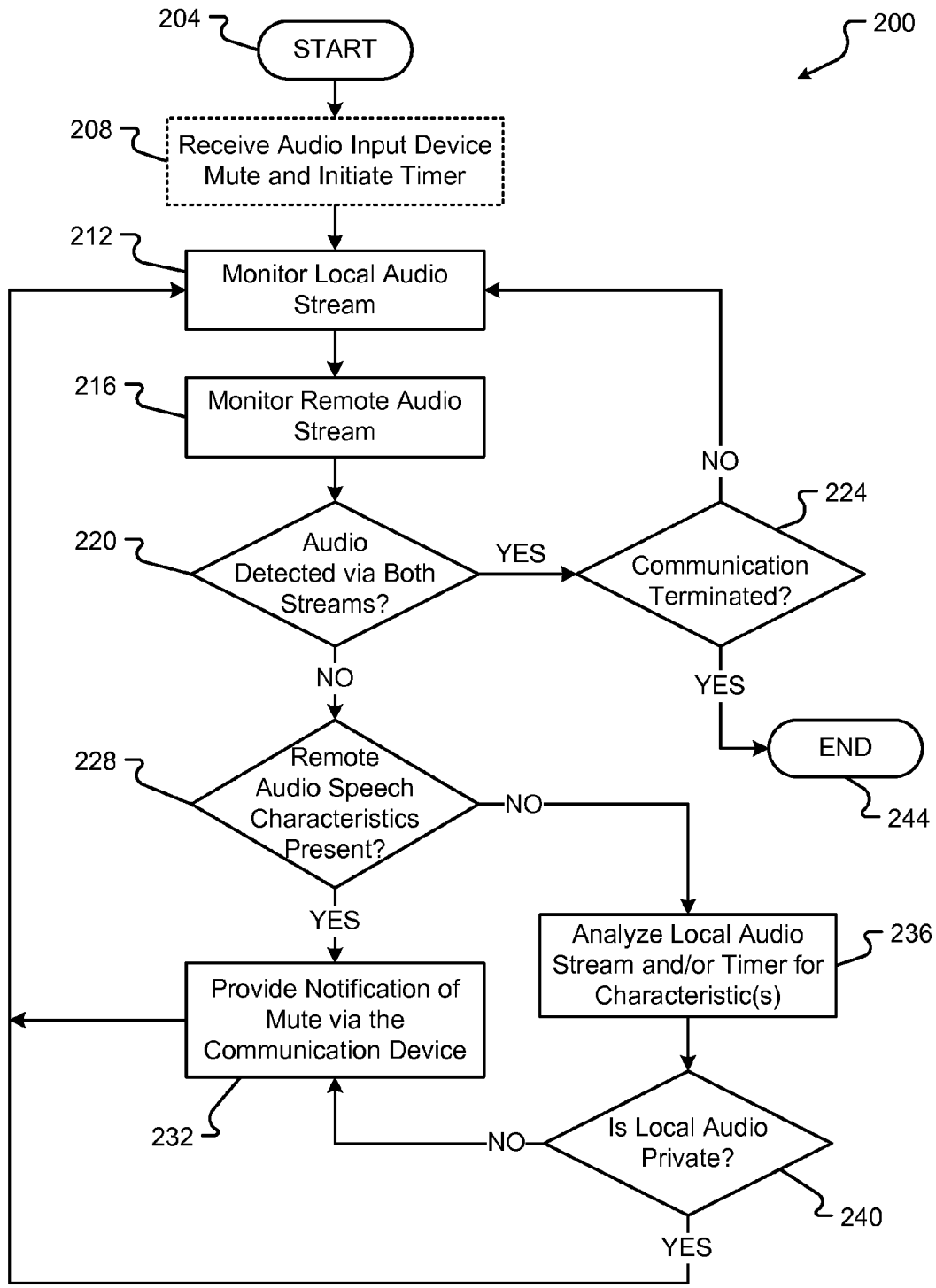
FIG. 2 is a flow diagram depicting a method of providing an intelligent mute notification in accordance with embodiments of the present disclosure.

Referring now to FIG. 2, a flow diagram is provided in accordance with embodiments of the present disclosure depicting a method 200 of providing an intelligent mute notification. The method 200 begins at step 204 when a communication device 108 is participating in a multi-party call. As can be appreciated, a multi-party call may include a call between at least one communication device 108 and at least one other communication device 108, entity, service, party, individual, group, combinations thereof, and the like, across a communication network 104.

In some embodiments, the method 200 may continue by receiving an input directed to activating a mute function associated with the communication device 108 (step 208). In some cases, the mute function may be activated by a user of the communication device 108. Additionally or alternatively, the mute function may be implemented via hardware, software, or a mute function employing a combination of hardware and software implementations. In some embodiments, the method 200 may initiate a timer when, or about the time when, the mute function is activated. The timer may include an expiration time. Examples of timers may include, but are not limited to, countdown timers, count-up timers, incrementing timers, decrementing timers, and other timers. The timer may be configured to count up to an expiration time or count down from an expiration time. In some embodiments, the expiration time may at least be used by the methods disclosed to provide an output, set a condition, alter a sequence, and more. Embodiments of the present disclosure anticipate utilizing the timer as provided herein.

In any event, the method 200 continues by monitoring the local audio stream and the remote audio stream (steps 212 and 216). The local audio stream can be provided to an audio input device 112 associated with the communication device 108, where local audio content is detected. Typically, the audio input device 112 may be configured to detect local audio content even when a mute function of the communication device 108 is active. Additionally or alternatively, the mute function of the communication device 108 may not mute the audio detection functionality of the audio input device 112. In one embodiment, when the mute function of the communication device 108 is active, neither the audio input device 112 nor any other audio input (e.g., receiver audio input, microphone) associated with the communication device 108 can transmit audio information to one or more participants in a multi-party call. Monitoring of the audio content, whether local, remote, or both, can be performed by the communication device 108, the conferencing service 116, some other processor, the audio analysis module 128, and/or other components of the communication device 108 or system 100.

Among other things, local audio content may include characteristics such as a user's speech, speech intonation, speech inflection, speech patterns, words, phrases, silence, combinations thereof, durations thereof, and the like. For example, a user may be talking in a whisper while the mute function of the communication device 108 is active. The audio input device 112 can detect that the user is talking in a softer volume (or whisper), when compared to a baseline measured volume, and may even monitor the content of the speech that is spoken in the soft voice. In another example, a user may be silent while the mute function of the communication device 108 is active. In this case, the audio input device 112 may determine that the local audio content includes silence and can even determine an amount of time that the local audio content remains silent.

The method 200 may monitor the remote audio stream for remote audio content (step 216). In some embodiments, the remote audio stream may include at least one combined audio signal from one or more parties participating in the multi-party call. This remote audio stream may be provided by a conferencing service 116, a communication device 108, and/or some other processor of the system 100, etc. In some cases, the remote audio stream may be output to an audio output device (e.g., a speaker) associated with the communication device 108. In one embodiment, the remote audio stream may be received by the communication device 108 from one signal source. In other embodiments, the remote audio stream may be received by the communication device 108 from a plurality of signal sources. In another embodiment, the remote audio may include the audio output from a communication device to at least one other communication device in the multi-party call. This audio output may include an audio signal delivered from the communication device to the at least one other communication device or system. The audio signal may comprise audio content ranging from silence (e.g., content having no speech, no noise, no sounds, or combinations thereof, etc.) to identifiable sounds (e.g., speech, whispers, shouting, sounds, combinations thereof, or the like).

In some embodiments, the remote audio content can include characteristics of at least one user's speech, speech intonation, speech inflection, speech patterns, words, phrases, silence, combinations thereof, durations thereof, and the like. For instance, at least one user may be asked a question in the remote audio stream. In some cases, the remote audio content associated with that remote audio stream may be monitored to detect that the question has been asked of a specific user participating in the multi-party call. In this example, the intonation and word spotting is used while monitoring. For instance, the intonation may indicate, based on upward inflection at the end of a phrase that a user has asked a question. Additionally or alternatively, the word spotting may detect that the question was asked when using another user's name. Among other things, this monitoring may serve to alter mute notification for at least one user, as provided herein.

The method 200 continues by determining whether audio is detected on both the local audio stream and the remote audio stream (step 220). In the event that audio is detected on both the local audio stream and the remote audio stream the method 200 may continue by determining whether the multi-party communication is terminated or active (step 224). If the multi-party communication is not terminated, the method 200 may return to monitoring the local and remote audio streams. In some embodiments, the multi-party communication may have terminated and the method may end at step 244. Additionally or alternatively, the method 200 may detect that the local audio content is absent from the remote audio content. In some cases, detecting that the local audio content is absent from the remote audio content can serve to indicate that the mute function of the communication device 108 is active. In one embodiment, the method 200 may compare the local audio content to the remote audio content to make this detection/determination, or vice versa. It is anticipated that the communication device 108, the conferencing service 116, the audio analysis module 128, and/or some other processor may perform this detection/determination. In some cases, at least one of the local audio content and the remote audio content may be stored in the memory 136. Among other things, storing the audio content in the memory can allow the method 200 to detect the lack of local audio content from the remote audio content at any time. For instance, the detection may be made in one or more of real-time (e.g., as the audio is detected by the audio input device 112), near-real-time (e.g., as the audio is detected by the audio input device 112 and subtracting any delay of processing components in the system 100), and in non-real-time (e.g., after the audio has been detected by the audio input device 112).

In the event that the audio is not detected in both the local audio stream and the remote audio stream, the method 200 continues by analyzing the audio for speech characteristics (step 228). In one embodiment, the method 200 may analyze audio for speech characteristics even when the local audio content is detected in both the local audio stream and the remote audio stream. In any event, the remote audio content may be analyzed for at least one speech characteristic. As provided above, the speech characteristic(s) may include, but is not limited to, at least one user's speech, speech intonation, speech inflection, speech patterns, words, phrases, silence, combinations thereof, durations thereof, and the like. For example, intonation and/or inflection may indicate that a question has been asked of a user who may have a muted communication device 108. Additionally or alternatively, the method 200 may determine that at least one party in the multi-party call has repeated words, phrases, and the like. This repetition may indicate that the at least one party did not receive a response from another party in the multi-party call. As another example, a user may specifically mention a name of another user on the multi-party call. This specific word use may be matched to a specific name, word, phrase, or combination thereof stored in memory to determine whether to provide a mute notification to a user who is associated with a communication device 108 having an active mute function.

In determining the at least one speech characteristic, the method 200 may utilize one or more speech analytics mechanisms. In one embodiment, the method 200 may determine that the at least one speech characteristic of the remote audio content matches a predetermined speech characteristic stored in memory. Similar to the at least one speech characteristic, the predetermined speech characteristic may include, but is not limited to, speech associated with a specific user, speech intonation, speech inflection, speech patterns, speech volume levels, words, phrases, silence, combinations thereof, durations thereof, and the like.

When it is determined that the remote audio speech characteristic exists in the remote audio content, the method 200 proceeds by providing a mute notification to the communication device 108 (step 232). In some embodiments, the mute notification may be initiated by providing an affirmative mute notification command to a notification service 132 associated with the communication device 108. As can be appreciated, upon receiving the affirmative mute notification command, the notification service 132 may provide the mute notification to the communication device 108. For example, the mute notification may include, but is not limited to, an audio, a visual, a tactile, a combination thereof, or other alert. Continuing this example, an audio mute notification may be output to an audio output device (e.g., speaker) associated with the communication device 112. The audio mute notification may produce a sound, tune, tone, combination thereof, or other audible emission, configured to emit via at least one component associated with the communication device 112.

When it is determined that the remote audio speech characteristic does not exist in the remote audio content, the method 200 may proceed by analyzing the local audio content and/or the timer for mute, or private conversation, characteristics (step 240). Among other things, the method 200 determines if mute characteristics exist in the local audio content that indicate whether the local audio content should be a part of the multi-party call or should remain private (and muted). The mute characteristics can include any, or all, of the characteristics previously disclosed in connection with local audio content and may include more characteristics related to privacy. Whether the local audio is private may be determined based on at least one of speech analytics, speech characteristics, and the use of timers.

In some embodiments, timers may be used to at least determine how much time has passed since a mute function of a communication device 108 was activated, how much time elapsed between the mute function being activated and a user providing local audio content, how much time passed between a communication device 108 receiving a mute notification and the mute function being deactivated, combinations thereof, to name a few. For instance, a user may initiate a mute function of a communication device 108 to hold a private (i.e., not for the multi-party call) conversation. Continuing this example, the method 200 may anticipate that a user initiated the mute function to hold the private conversation by determining that the user spoke within a given time period (e.g., 4 seconds or less, etc.) of initiating the mute function. In some embodiments, this time period may be equivalent to the expiration time of the timer. When this given time period passes the user may have forgotten that the mute function is initiated and any speech provided outside of this given time period can prompt a mute notification to be issued.

In accordance with some embodiments of the present disclosure, the method 200 may determine that the local audio content includes mute characteristics that are associated with speech characteristics of the local audio content. For instance, a user may talk in a quiet voice while on mute, the user may talk over other parties that are talking in the multi-party call, the user may employ a different speech tone, use different language, etc. Speech characteristics of a user may be stored in a memory and used to create a baseline for comparison to the speech characteristics collected from the local audio content. Additionally or alternatively, mute function behavior and patterns may be stored in memory and even associated with a particular user. All of this information may be stored in memory and used to create mute characteristics that can be assigned to specific instances of speech and/or timing to classify the speech and/or timing as belonging to a private conversation. Continuing the example provided above, if a user is talking in a quiet voice, the mute characteristics may associate the quiet voice with that of a private conversation. In other words, the quiet voice would not prompt a mute notification.

The method 200 continues by determining whether the local audio content is private (step 240). For instance, the method 200 can determine whether the mute characteristics match criteria that defines whether the local audio content is private. If the local audio content is not determined to be private, the method 200 proceeds by providing the mute notification as described in relation to step 232. In the event that the local audio content is determined to be private, the method 200 proceeds by continuing to monitor the audio streams as provided in steps 212 and 216. It should be appreciated that the mute characteristics, including timers, speech analytics, and other information may be adjusted, modified, added to, deleted, and/or otherwise changed based on historical data.

Figure 3:
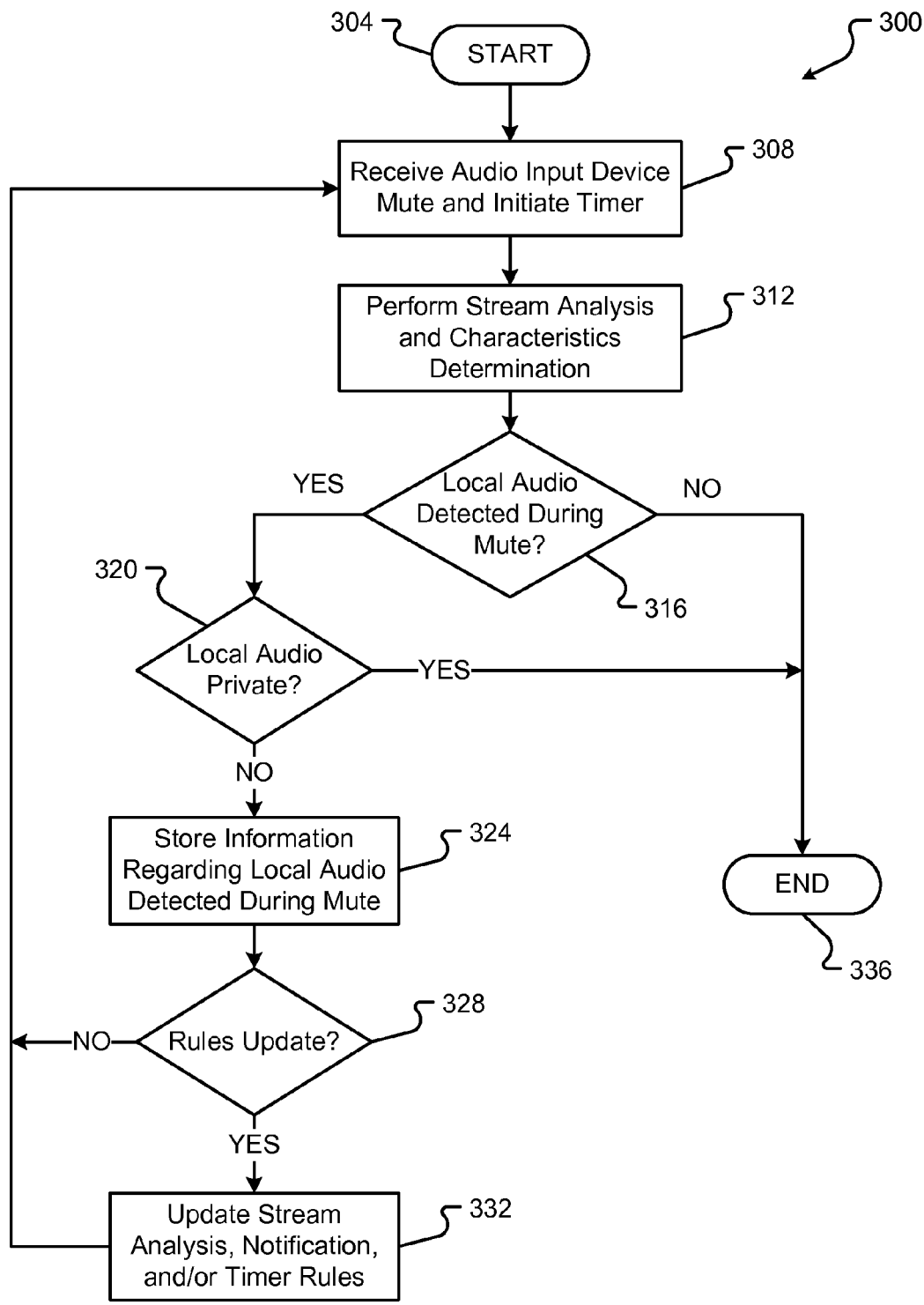
FIG. 3 is a flow diagram depicting a method of dynamically updating rules associated with an intelligent mute notification in accordance with embodiments of the present disclosure.

FIG. 3 is a flow diagram depicting a method 300 of dynamically updating rules associated with an intelligent mute notification in accordance with embodiments of the present disclosure. The method begins at step 304 and proceeds when an input is received that activates a mute function associated with the communication device 108 (step 308). In a time period surrounding the activation of the mute function, a timer having an expiration time may be initiated. The timer may be similar, if not identical, in function to the timers disclosed above.

The method 300 continues by performing the audio stream analysis and characteristics determination as disclosed in conjunction with steps 220 through 236 of FIG. 2. Next, the method 300 determines whether any local audio content is detected while the mute function of the communication device 108 is active. If no local audio content is detected at this point, the method 300 may end at step 336, or return to step 308. As provided herein, the local audio content may include inadvertent noises, user speech, and/or other characteristics associated with speech from the local audio stream.

In the event that local audio content is detected while the mute function of the communication device 108 is active, the method 300 proceeds by determining whether the local audio content is private (step 320). For instance, if the user has spoken within a given time period (e.g., 1, 2, 3, or 4 seconds or less, etc.) of activating the mute function the local audio content may be determined to be private. In some embodiments, this time period may be equivalent to the expiration time of the timer. Additionally or alternatively, if the user speaks after the given time period (or expiration time of the timer), the user may be provided with a mute notification. Continuing this example, if the user subsequently deactivates the mute function of the communication device 108 within a time period of receiving the mute notification, then the local audio content may be determined to be non-private. If the local audio content is determined to be private, the method 300 may end at step 336 or continue by updating stream analysis, notification, and/or timer rules (step 332).

When the local audio content is determined to be non-private, the method 300 continues by storing information associated with at least one of the deactivation of the mute function, the local audio content, characteristics thereof, combinations thereof, etc. (step 324). The information may be stored in the memory 136 of the communication device 108, conferencing service 116, or some other server of the system 100. Among other things, this information may be used to update rules associated with mute notification. For instance, if a user continually attempts to speak through mute, and deactivates the mute function after receiving the mute notification, the mute notification method 300 provided herein may alter the timing of the mute notification such that it is provided to the user earlier in time than the unaltered timing (e.g., as soon as the user begins to speak through mute). As can be appreciated, the embodiments of the method 300 may optimize providing the mute notification by continually reviewing a user's habits and behavior when the mute function is active and or inactive and altering timers, rules, and notification presentation to suit the stored habits and behavior.

The method 300 continues by determining whether a rules update is required based on the stored information (step 328). If no rules update is required, the method 300 may end at step 336 or return to step 308.

When a rules update is required, based on the stored information in memory, the method 300 continues by updating the rules associated with the mute notification (step 332). The rules update may include adjusting timers, notification rules, characteristics, stream analysis rules, and the like. As can be appreciated, these rules may be stored in the memory 136 of the communication device 108, conferencing service 116, or some other server of the system 100. Additionally or alternatively, the rules may be automatically updated and/or written by one or more users in the system 100. One example of updating the rules may include, but is not limited to, adjusting the expiration time of the timer that may be initiated when the mute function activation input is received. As can be appreciated, this timer may be adjusted for one or more of the current multi-party call, future calls, locally (at the communication device 108), and globally (at two or more communication devices 108 of the system 100).

For example, the expiration of the timer may be increased when the stored information indicates that the mute function is not deactivated within the given time period after detecting local audio content. In this example, a user may have activated the mute function of the communication device 108 and then spoken during mute. Continuing the example, the user may have been provided with a mute notification, but the user may not have deactivated the mute function because the user's speech was private. This information may be stored in the memory. As can be appreciated, the method 300 can adjust the expiration time of the timer to prevent mute notifications in the future based on this stored information. By increasing the expiration time in this case, the user would not be provided with a mute notification in subsequent and similar muted scenarios unless the timer expires or other conditions were met that warranted issuing the mute notification.

In another example, the expiration of the timer may be decreased when the stored information indicates that the mute function is deactivated within the given time period after detecting local audio content. In this example, a user may have activated the mute function of the communication device 108 and then spoken during mute. The user may have been provided with a mute notification, and then the user may have deactivated the mute function because the user's speech was intended for the participants of the multi-party call (e.g., non-private). This information may be stored in the memory. As can be appreciated, the method 300 can adjust the expiration time of the timer to provide mute notifications in the future based on this stored information. Given the same circumstances, by decreasing the expiration time in this instance, the user would be provided with a mute notification earlier than when the original expiration time was used.

Figure 4:
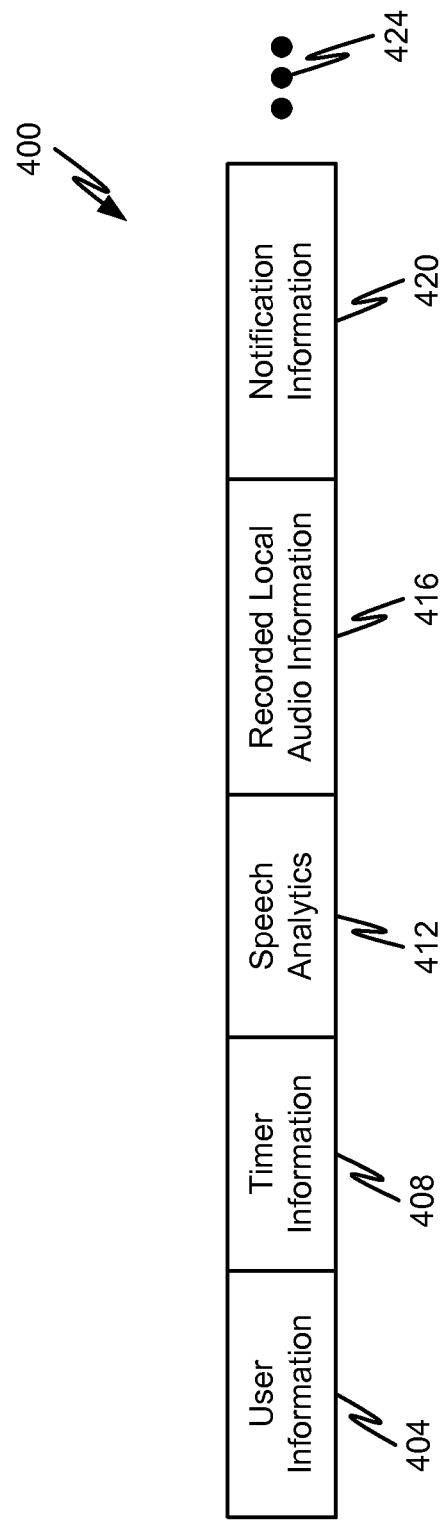
FIG. 4 is a block diagram depicting a data structure used in accordance with embodiments of the present disclosure.

FIG. 4 is a block diagram depicting a data structure 400 used in accordance with embodiments of the present disclosure and which may be created, stored, and/or maintained by the memory 136. Specifically, each multi-party call and/or communication device 108, may have a corresponding data structure 400 which contains information relating to a specific user in a user information field 404, provides timer, expiration times, and other timer related information in a timer information field 408, maintains speech-based characteristic information in a speech analytics field 412, provides information relating to local audio content in a recorded local audio information field 416, specifies preferences and settings in a notification information field 420, and may include additional fields 424 for other data as provided herein.

The user information field 404 may comprise data that identifies one user from another user of the communication device 108. Among other things, this field 404 may include, but is not limited to, user habits, behaviors, preferences, and identifying information. Additionally or alternatively, the user information field 404 may be used by the communication device 108 in loading predetermined timers, notification settings, altering one or more settings, times, values, and the like.

The timer information field 408 may comprise data related to one or more of the timers as provided herein. For instance, the timer information field 408 may contain the expiration time value, settings, averages, default values, historical adjustment information, and the like. As can be appreciated, this field 408 may be used by the communication device 108 in setting timers related to the methods 200, 300 provided herein. Among other things, the communication device 108 may utilize timer information stored in the timer information field 408 to set the expiration time of the timer when the mute function is activated. In some embodiments, the timer information field 408 may include timer settings related to those timers that become active between receiving a mute notification and deactivating a mute function of the communication device 108.

The speech analytics field 412 may comprise data relating to speech recognition, pattern identification, and characteristics, to name a few. In some embodiments, the speech analytics field 412 may comprise baseline speech patterns for one or more of multi-party calls, private conversations, noise, and the like. It is anticipated that the audio analysis module 128, as disclosed herein, may refer to this field 412 when determining whether remote or local audio content includes characteristics that result in providing a mute notification to a communication device 108.

The recorded local audio information field 416 may comprise data that is associated with the local audio stream of the multi-party call. In one embodiment, this field 416 may include information relating to the number of times that a user spoke during mute. In some embodiments, the field 416 may include information relating to the number of times a mute function of the communication device 108 was deactivated. Additionally or alternatively, the number of times a mute function of the communication device 108 was deactivated may be correlated to a mute notification received by the communication device 108 prior to deactivation of the mute function. As can be appreciated, the timing related to the activation and/or deactivation of the mute function may be stored in this field 416. The information in this field 416 may be used to refine false positives associated with mute notifications, adjusting timers, updating rules, and the like.

The notification information field 420 may comprise data that identifies specific notification types, durations, and the like. In one embodiment, the notification information field may include information that classifies a type of presentation associated with the mute notification as provided in the disclosure. Examples of mute notification presentation types may include, but are not limited to, audible, visual, tactile, combinations thereof, and the like. In some embodiments, the notification information field 420 may include an affirmative mute notification command that can be received by a notification service 132 in providing a mute notification to a communication device 108.

Furthermore, in the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method, comprising:
    monitoring a local audio stream collected by an audio input device associated with a communication device in a multi-party call for local audio content, wherein the multi-party call includes a plurality of communication devices communicatively connected across a communication network;
    monitoring a remote audio stream associated with the multi-party call for remote audio content, wherein the remote audio stream represents a combined signal of audio content received from each communication device participating in the multi-party call;
    determining, by the communication device and based on the remote audio content, whether the local audio content is absent from the remote audio content; and
    providing, by a notification service associated with the communication device, a mute notification to the communication device when the local audio content is determined to be absent from the remote audio content, wherein the mute notification causes the communication device to present at least one audible and visual alert to an output device of the communication device.

2. The method of claim 1, wherein the audio input device is configured to detect local audio when a mute function of the communication device is active and wherein the at least one audible and visual alert is configured to notify a user that the mute function is active.

3. The method of claim 2, wherein the audio input device is separate from an audio receiver input device of the communication device, wherein the audio receiver input device of the communication device is configured to receive the local audio content and provide the local audio content to the plurality of communication devices in the multi-party call when a mute function of the communication device is inactive and prevent the local audio content from being provided to the plurality of communication devices in the multi-party call when the mute function of the communication device is active.

4. The method of claim 1, wherein prior to providing the mute notification to the communication device the method further comprises:
    analyzing the remote audio content for at least one speech characteristic;
    determining whether the at least one speech characteristic of the remote audio content matches a predetermined speech characteristic stored in a memory; and
    wherein the mute notification is provided only when it is determined that the at least one speech characteristic of the remote audio content matches the predetermined speech characteristic stored in the memory.

5. The method of claim 1, wherein prior to monitoring the local audio stream, the method further comprises:
    receiving an input associated with an activation of a mute function of the communication device; and
    initiating a timer having an expiration time, in response to receiving the input associated with the activation of a mute function.

6. The method of claim 5, wherein prior to providing the mute notification to the communication device the method further comprises:
    analyzing the local audio content for at least one speech characteristic; and
    determining whether the at least one speech characteristic of the local audio content is provided to the audio input device prior to or after the expiration time of the timer.

7. The method of claim 6, wherein the mute notification is provided only when it is determined that the at least one speech characteristic of the local audio content is provided after the expiration time of the timer.

8. The method of claim 7, wherein the method further comprises:
    detecting whether the mute function of the communication device is deactivated within a time period of providing the mute notification to the communication device; and
    storing, in a memory and in response to detecting whether the mute function of the communication device is deactivated, information associated with the mute function deactivation.

9. The method of claim 8, wherein the method further comprises:

adjusting the expiration time of the timer based at least partially on the stored information associated with the mute function deactivation, wherein at least one of the expiration time is increased when the stored information indicates that the mute function is not deactivated within the time period, and the expiration time is decreased when the stored information indicates that the mute function is deactivated within the time period.

10. The method of claim 6, wherein prior to providing the mute notification to the communication device the method further comprises:
  determining that the at least one speech characteristic of the local audio content is provided prior to the expiration time of the timer;
  determining whether the at least one speech characteristic of the local audio content matches a private conversation characteristic stored in memory; and
  wherein the mute notification is provided only when it is determined that at least one of the at least one speech characteristic of the local audio content fails to match the private conversation characteristic stored in the memory and a subsequent speech characteristic is provided after the expiration time of the timer.

11. A non-transitory computer readable medium having stored thereon instructions that, when executed by a processor, perform a method comprising:
  monitoring a local audio stream collected by an audio input device associated with a communication device in a multi-party call for local audio content, wherein the multi-party call includes a plurality of communication devices communicatively connected across a communication network;
  monitoring a remote audio stream associated with the multi-party call for remote audio content, wherein the remote audio stream represents a combined signal of audio content received from each communication device participating in the multi-party call;
  determining, by the communication device and based on the remote audio content, whether the local audio content is absent from the remote audio content; and
  providing, by a notification service associated with the communication device, a mute notification to the communication device when the local audio content is determined to be absent from the remote audio content, wherein the mute notification causes the communication device to present at least one audible and visual alert to an output device of the communication device.

12. The non-transitory computer readable medium of claim 11, wherein prior to the mute notification to the communication device the method further comprises:
  analyzing the remote audio content for at least one speech characteristic;
  determining whether the at least one speech characteristic of the remote audio content matches a predetermined speech characteristic stored in a memory; and
  wherein the mute notification is provided only when it is determined that the at least one speech characteristic of the remote audio content matches the predetermined speech characteristic stored in the memory.

13. The non-transitory computer readable medium of claim 11, wherein prior to monitoring the local audio stream, the method further comprises:
  receiving an input associated with an activation of a mute function of the communication device; and
  initiating a timer having an expiration time, in response to receiving the input associated with the activation of a mute function.

14. The non-transitory computer readable medium of claim 13, wherein prior to the mute notification to the communication device the method further comprises:
  analyzing the local audio content for at least one speech characteristic; and
  determining whether the at least one speech characteristic of the local audio content is provided to the audio input device prior to or after the expiration time of the timer.

15. The non-transitory computer readable medium of claim 14, wherein the mute notification is provided only when it is determined that the at least one speech characteristic of the local audio content is provided after the expiration time of the timer.

16. The non-transitory computer readable medium of claim 15, wherein the method further comprises:
  detecting whether the mute function of the communication device is deactivated within a time period of providing the mute notification to the communication device; and
  storing, in a memory and in response to detecting whether the mute function of the communication device is deactivated, information associated with the mute function deactivation.

17. The non-transitory computer readable medium of claim 16, wherein the method further comprises:
  adjusting the expiration time of the timer based at least partially on the stored information associated with the mute function deactivation, wherein at least one of the expiration time is increased when the stored information indicates that the mute function is not deactivated within the time period, and the expiration time is decreased when the stored information indicates that the mute function is deactivated within the time period.

18. The non-transitory computer readable medium of claim 14, wherein prior to providing the mute notification to the communication device the method further comprises:
  determining that the at least one speech characteristic of the local audio content is provided prior to the expiration time of the timer;
  determining whether the at least one speech characteristic of the local audio content matches a private conversation characteristic stored in memory; and
  wherein the mute notification is provided only when it is determined that at least one of the at least one speech characteristic of the local audio content fails to match the private conversation characteristic stored in the memory and a subsequent speech characteristic is provided after the expiration time of the timer.

19. A communication device, comprising:
  a memory;
  a processor;
  a communication module configured to participate in a multi-party call;
  an audio input device;
  an audio analysis module configured to monitor a local audio stream collected by the audio input device associated with the communication device in the multi-party call for local audio content, wherein the multi-party call includes a plurality of communication devices communicatively connected across a communication network, monitor a remote audio stream associated with the multi-party call for remote audio content, wherein the remote audio stream represents a combined signal of audio content received from each communication device participating in the multi-party call, and determine, based on the remote audio content, whether the local audio content is absent from the remote audio content, whether to provide a mute notification to the communication device; and a notification service configured to provide the mute notification to the communication device when the local audio content is determined to be absent from the remote audio content, wherein the mute notification causes the communication device to present at least one audible and visual alert to an output device of the communication device.

20. The communication device of claim 19, further comprising:

an audio receiver input device, wherein the audio receiver input device of the communication device is configured to receive the local audio content and provide the local audio content to the plurality of communication devices in the multi-party call when a mute function of the communication device is inactive and prevent the local audio content from being provided to the plurality of communication devices in the multi-party call when the mute function of the communication device is active, and wherein the audio input device is configured to detect local audio when a mute function of the communication device is active, and wherein the audio input device is separate from the audio receiver input device of the communication device.

* * * * *

UNITED STATES PATENT AND TRADEMARK OFFICE
CERTIFICATE OF CORRECTION

PATENT NO. : 9,560,208 B2
APPLICATION NO. : 14/149028
DATED : January 31, 2017
INVENTOR(S) : Michael Krack et al.

It is certified that error appears in the above-identified patent and that said Letters Patent is hereby corrected as shown below:

In the Claims

At Column 19, Line 49, after "wherein prior to" add --providing-- therein.

At Column 20, Line 2, after "wherein prior to" add --providing-- therein.

Signed and Sealed this
Fifth Day of September, 2017

Joseph Matal
*Performing the Functions and Duties of the
Under Secretary of Commerce for Intellectual Property and
Director of the United States Patent and Trademark Office*